US010544057B2

(12) United States Patent
Cocchini et al.

(10) Patent No.: US 10,544,057 B2
(45) Date of Patent: Jan. 28, 2020

(54) METHOD OF MANUFACTURING PREFORMS FOR OPTICAL FIBRES HAVING LOW ATTENUATION LOSS

(71) Applicant: Prysmian S.p.A, Milan (MI) (IT)

(72) Inventors: Franco Cocchini, Milan (IT); Antonio Adigrat, Milan (IT); Valeria Caronna, Milan (IT); Marco Antonio Caiata, Milan (IT); Antonio Collaro, Milan (IT); Antonio Schiaffo, Milan (IT)

(73) Assignee: PRYSMIAN S.p.A., Milan (IT)

( * ) Notice: Subject to any disclaimer, the term of this patent is extended or adjusted under 35 U.S.C. 154(b) by 91 days.

(21) Appl. No.: 15/735,684

(22) PCT Filed: Jun. 12, 2015

(86) PCT No.: PCT/EP2015/063232
§ 371 (c)(1),
(2) Date: Dec. 12, 2017

(87) PCT Pub. No.: WO2016/198125
PCT Pub. Date: Dec. 15, 2016

(65) Prior Publication Data
US 2018/0265395 A1    Sep. 20, 2018

(51) Int. Cl.
*C03B 37/014* (2006.01)
*C03B 37/012* (2006.01)
*C03C 13/04* (2006.01)

(52) U.S. Cl.
CPC .... *C03B 37/01446* (2013.01); *C03B 37/0124* (2013.01); *C03B 37/01473* (2013.01);
(Continued)

(58) Field of Classification Search
CPC .............. C03B 37/00; C03B 37/01422; C03B 37/01446
See application file for complete search history.

(56) References Cited

U.S. PATENT DOCUMENTS 6,477,305 B1    11/2002    Berkey et al.
2002/0178761 A1*    12/2002    Cummings ....... C03B 37/01225
65/417
(Continued)

FOREIGN PATENT DOCUMENTS

EP    1783104 A1    5/2007
WO    2006071865 A2    7/2006

OTHER PUBLICATIONS

Effect of Chlorine on Rayleigh Scattering Reduction in Silica Glass; Authors: Hiroshi Kakiuchida et al.; Research Center for Advanced Photon Technology, Toyota Technological Institute; accepted Oct. 15, 2003; published Dec. 3, 2003; 3 pages.
(Continued)

*Primary Examiner* — Cynthia Szewczyk
(74) *Attorney, Agent, or Firm* — Shumaker, Loop & Kendrick, LLP (57) ABSTRACT

A method of manufacturing a glass core preform for an optical fibre comprising: providing a porous soot core preform having an outer surface) and a central hole extending axially therethrough; dehydrating the porous soot core preform at a first temperature by exposing the outer surface of the preform to an atmosphere containing chlorine, and simultaneously consolidating the soot core preform and closing the central hole at a second temperature higher than the first temperature to form a glass core preform, wherein consolidating and closing comprises sequentially alternating flowing chlorine containing gas into the central hole and reducing the internal pressure of the central hole.

13 Claims, 2 Drawing Sheets

(52) U.S. Cl.
CPC ...... *C03B 37/01493* (2013.01); *C03C 13/045* (2013.01); *C03B 2201/31* (2013.01)

(56) References Cited

U.S. PATENT DOCUMENTS

2003/0221459 A1* 12/2003 Walczak ........... C03B 37/01446
65/398
2012/0297837 A1   11/2012 Ishihara

OTHER PUBLICATIONS

International Search Report and Written Opinion of corresponding International Application No. PCT/EP2015/063232; dated Feb. 3, 2016; 10 pages.

* cited by examiner

METHOD OF MANUFACTURING PREFORMS FOR OPTICAL FIBRES HAVING LOW ATTENUATION LOSS

FIELD OF INVENTION

The present invention relates to a method of manufacturing a preform for optical fibres and in particular to a method of manufacturing a preform for optical transmission fibres having low attenuation loss.

RELATED ART

Wavelength division multiplexing (WDM) technology and the more recent dense wavelength division multiplexing technology (DWDM) have pushed manufacturers of optical transmission fibres to produce fibres having a very small optical attenuation across a broad wavelength region of the transmission spectrum. Attenuation loss (or optical power/transmission loss) of optical signals travelling in the fibre is dependent on wavelength. The causes of signal loss in the fibre are scattering and absorption, which originates from intrinsic and extrinsic material properties of the fibre.

One of the major intrinsic contributions to the attenuation is that of Rayleigh scattering due to density and concentration fluctuations in the glass matrix on lengths of the same order of the light wavelength. A decrease of viscosity of the glass allows a better relaxation of the glass network leading to a reduced density fluctuations. Chlorine is known to accelerate structural relaxation. Kakiuchida H. et al. in "*Effect of Chlorine on Rayleigh Scattering Reduction in Silica Glass*", published in Jpn. J. Appl. Phys. 42 (2003), Part 2, No. 12B, pp. L1526-L1528, measured Rayleigh-scattered light intensities of silica glass samples prepared by vapour-phase axial deposition (VAD) and containing chlorine with concentrations from 0 to 1.8 mol %. Results indicated that chlorine dopant influences neither density nor concentration fluctuations. On the other hand, authors found that the frozen-in temperature, $T_f$, which is proportional to the Rayleigh scattering caused by density fluctuations, can be lowered by heat treatment for a shorter duration with a higher chlorine concentration. Extrinsic absorption is caused by impurities introduced into the fibre material during manufacturing of the optical fibre, occurring from trace metal impurities and from hydroxyl radicals (—OH) present in the optically active region of the fibre. The —OH groups and water can be formed during manufacturing when the optical fibre preform is exposed to hydrogen, which can come from various sources. Contamination from hydroxyl radicals causes an optical signal attenuation at 1380 nm, visible in the attenuation spectrum as a peak generally referred to as the "water peak".

A common procedure to obtain a glass preform to be drawn down to an optical fibre of typical diameter of about 125 μm comprises a first process for producing a core rod of solid glass having a central light-conducting core, and a second process in which a surrounding overcladding is added to the core rod by a suitable process, e.g. by deposition of soot about the core rod or by jacketing the core rod in a glass tube (rod-in-tube technology).

The core soot body, especially when made by outside vapour deposition (OVD), has typically a core region surrounded by a near clad region, also indicated as inner clad region, often made of pure silica, although it may comprise one or more layers of doped silica, for example a fluorine-doped layer to form a trench in the refractive index profile, outside the core region. The resultant soot body is then dried and consolidated in a furnace to form a glass body. A stretching follows the consolidation in order to reduce the diameter of the glass body, which is then severed into a plurality of core rods. Alternatively, core rods may also be made by VAD (Vapour Axial Deposition), inside deposition processes such as Modified, or Furnace Chemical Vapour Deposition (MCVD/FCVD), or Plasma Chemical Vapour Deposition (PCVD).

To form a core soot body by OVD process, soot is deposited by a traversing torch on a rotating mandrel, which is removed at the end of the deposition process, leaving a central axial hole in the soot body:

A method of making a solid glass preform for optical waveguide filaments by flame hydrolysis technique is described in U.S. Pat. No. 4,251,251.

The central (or centreline) hole (or channel) of the soot core preform is known to be a critical point for OH— contamination. Drying the soot preform before consolidation in a chlorine containing atmosphere in known to effectively remove water and other impurities from the porous body. U.S. Pat. No. 6,477,305 describes a method of manufacturing a low water peak optical fibre. In the patent, it is observed that, conventionally, core soot blanks made by OVD process were consolidated in a chlorine containing atmosphere to chemically dry the blank and thus form a consolidated glass preform having a centreline hole extending axially therethrough. The core glass preform was then positioned within a redraw furnace and heated to a temperature sufficient to facilitate redrawing or stretching of the core preform into a smaller diameter cylindrical glass body. During the redraw operation, the centreline hole of the core blank was closed by applying vacuum along the centreline hole. The reduction in pressure within the centreline hole ensured complete closure of the centreline hole.

In the method disclosed in U.S. Pat. No. 6,477,305, the core porous body was suspended on a downfeed handle and positioned within a consolidation furnace. Porous body was chemically dried by exposing the body to a chlorine containing atmosphere at elevated temperature within the consolidation furnace to dry the entire blank, including the region surrounding centreline hole. Following chemical drying, the temperature of the furnace was elevated to a temperature sufficient to consolidate the soot blank into a sintered glass preform, preferably about 1500° C. Centreline hole was said to be closed, either during or following the consolidation step. The patent reports that the resulting optical fibre exhibited an optical attenuation of less than about 0.35 dB/km at a wavelength of 1380 nm.

U.S. Pat. No. 7,908,888 describes a process for producing a low-attenuation optical fibre, comprising: producing a soot core preform by chemical deposition on a substrate; removing the substrate from the soot core preform, thereby forming a central hole along the soot preform; drying and consolidating the soot core preform to form a glass core preform; and stretching the glass core preform; wherein the step of drying and consolidating comprises reducing the diameter of the central hole and the step of stretching comprises closing the central hole.

SUMMARY

Chlorine is typically used as drying gas in a dehydration phase of the porous preform, generally unsintered, preceding a consolidation phase in which consolidation of the preform takes place in order to form a preform of solid glass. Applicant considered that extending the processing time of purging with chlorine the soot preform may enhance the removal of hydroxyl ions and/or of metal impurities.

Applicant observed that it would be advantageous to complete collapse the central hole of the core preform during the consolidation process since it would prevent rewetting of the internal surface of the glass preform in subsequent process steps. Rewetting would cause an additional contribution to optical attenuation.

Applicant realised that by injecting relatively short pulses of chlorine-containing gas into the central longitudinal hole in between repeated exposures of the central hole to a reduced internal pressure during consolidation optical performance of the optical fibre can improve, especially in terms of optical attenuation.

Applicant has found that low optical attenuation can be attained by using a chlorine-containing gas as purging gas during a simultaneous process of consolidation of the soot core preform and collapse of the central longitudinal hole by sequentially alternating flowing of chlorine-containing gas down into the central hole and reduction of pressure in the central hole.

Consistently with the present disclosure, a method of manufacturing a glass core preform for an optical fibre is provided, the method comprising:
providing a porous soot core preform having an outer surface and a central hole extending axially therethrough;
dehydrating the porous soot core preform at a first temperature by exposing the outer surface of the preform to an atmosphere containing chlorine, and
simultaneously consolidating the soot core preform and closing the central hole at a second temperature higher than the first temperature to form a glass core preform,
wherein simultaneously consolidating and closing comprises sequentially alternating flowing chlorine-containing gas into the central hole and reducing the internal pressure of the central hole.

A single sequence of alternated flowing of chlorine-containing gas and reduction of pressure defines a cycle. In a cycle, flowing chlorine-containing gas into the central hole is for a first time, $t_G$, and reduction of internal pressure in the central hole is for a second time, $t_V$. The alternate flowing of chlorine-containing gas and creation of a reduced pressure in the central hole is repeated continuously during the consolidation process so as to define a plurality of subsequent cycles allowing a complete closure of the central hole of the core preform.

Preferably, reducing the internal pressure in the central hole is to a pressure of equal to or less than 100 mbar. Preferably, reducing the pressure in the central hole is by applying vacuum. Vacuum can be applied from a vacuum source, such as a vacuum pump. Typical pressure values in some embodiments consistent with the present disclosure are of from $10^{-2}$ mbar to 90 mbar, although lower pressure values may be used and are believed to work well.

It is to be understood that with first time $t_G$ and second time $t_V$ it is meant the duration of the gas pulse and of the reduction of pressure (e.g. application of vacuum), respectively.

In some embodiments, the sequential alternation of flowing of chlorine-containing gas and reducing the internal pressure is such that flowing of chlorine-containing gas immediately precedes (or is subsequent to) reducing the internal pressure. In an embodiment, there is no delay between the first and second times.

In some embodiments, the second time is subsequent to the first time. Definitions of "first time" and "second time" should not be understood as being limited to a specific sequential order of the alternate flowing of chlorine-containing gas and creation of a reduced pressure in a single cycle. For example, a cycle can consists of a reduction of pressure lasting a time $t_V$ immediately followed by a chlorine-containing gas pulse lasting a time $t_G$, and the cycle can be repeated continuously during the simultaneous consolidation and closure of the central hole.

The first time $t_G$ is preferably of from 5 seconds (s) to 40 s, more preferably of from 10 s to 30 s. Applicant has noticed that, in some embodiments, values of $t_G$ larger than 40 s may prevent a uniform collapse of the central hole of the preform. In some embodiments, the $t_G$ value is preferably less than the descent of the core preform in the consolidation zone through a length of 1 to 2 mm.

Preferably, the ratio between the first time and the second time, $t_G/t_V$, is of from 1/100 to 1/10, more preferably of from 1/70 to 1/25.

In some embodiments, the second time $t_V$ is of from 1.5 minutes (min) to 30 min, more preferably of from 2 min to 20 min.

In an embodiment, $t_G$ and $t_V$ are the same for each cycle of the plurality of subsequent cycles.

Generally speaking, time duration of the gas pulses depends, at least to some extent, on the flow rate of the gas during the shots down the central hole. Without wishing to be bound by any explanation, since chlorine-containing gas is flown for a relatively short time $t_G$, no constant regime of gas flow is very likely to be reached in a cycle. Applicant observed that in some preferred embodiments time and flow rate of the chlorine-containing gas pulses are selected so as to fill the preform channel with the chlorine containing gas to a pressure equal to or larger than atmospheric pressure, preferably of less than 2 bar.

In an embodiment, flowing chlorine containing gas into the preform central hole is at a flow rate and for a first time selected so as to fill the preform central hole with the chlorine containing gas to about the atmospheric pressure. In this embodiment, the core preform central channel is filled with the chlorine-containing gas to about the atmospheric pressure, i.e. 1 bar, at each shot.

Preferably, the consolidation process is carried out while the outer surface of the core preform is exposed to an atmosphere containing an inert gas, preferably helium.

During the consolidation process, it is preferred that the only source of chlorine is from the gas pulses down the preform central hole. To this end, the atmosphere, which the preform outer surface is exposed to during consolidation, is substantially devoid of chlorine. In accordance with these embodiments, simultaneous consolidation and closure of the central hole comprises exposing the outer surface of the core preform to an atmosphere containing an inert gas and substantially devoid of chlorine.

With reference to "chlorine-containing gas" it is meant a gas or a gas mixture containing chlorine. Preferably, the chlorine-containing gas consists of a single gas, for example $SiCl_4$ or $Cl_2$. In some preferred embodiments, the chlorine-containing gas is $Cl_2$ gas.

With reference to an atmosphere "substantially devoid of chlorine" it is meant an atmosphere having no intentionally added chlorine.

In an embodiment, sequentially alternating flowing chlorine-containing gas into the central hole and reducing the internal pressure of the central hole is realised by alternatively connecting the central hole to a vacuum source and to a source of chlorine-containing gas.

In some preferred embodiments, dehydrating comprises exposing the outer surface of the soot core preform to a drying hot zone of a furnace body, the drying hot zone being at the first temperature, and consolidating comprising exposing the preform to a consolidation hot zone of a furnace body, the consolidation hot zone being at the second temperature.

Preferably, the first temperature is of from 950° C. to 1100° C.

Preferably, the second temperature is of from 1500° C. to 1600° C.

In some embodiments, the furnace body is elongated with the consolidation hot zone being positioned below the drying hot zone and has a transition zone positioned longitudinally between the drying hot zone and the consolidation hot zone, the method further comprising, between dehydrating and consolidating:

setting the consolidation hot zone at a third temperature higher than the first temperature and lower than the second temperature;

moving the core preform from the drying hot zone towards the consolidation hot zone through a first section of the transition zone;

setting the consolidation hot zone at the second temperature while keeping moving the core preform through a second section of the transition zone longitudinally adjacent to the first section of the transition zone until the preform enters the consolidation hot zone.

Preferably, the third temperature is of from 1450° C. to 1550° C.

Consistently with the present disclosure, a method of manufacturing an optical fibre is described, the method comprising:

manufacturing a glass core preform having an outer diameter;

stretching the glass core preform to reduce its outer diameter thereby forming at least one glass core rod;

overcladding the glass core rod to form a glass optical fibre preform formed by the glass core rod surrounded by a glass overclad layer, and drawing the optical fibre preform to fabricate an optical fibre.

In some embodiments, average values of optical attenuation at 1330 nm and at 1550 nm are of less than 0.32 dB/km and less than 0.18 dB/km, respectively, whereas the attenuation at 1380 nm (water peak) is smaller than 0.32 dB/km.

Without wishing to be bound by any theory or explanation, Applicant believes that a controlled presence of chlorine gas during consolidation and collapse process assists an efficient removal of metal impurities, while avoiding the formation of structural defects in the core region, which may be detrimental for the optical attenuation.

In some embodiments, using chlorine gas during consolidation allows the reduction of dehydration time required for obtaining an optical fibre with low attenuation.

In some embodiments, the process of manufacturing an optical fibre comprises a slow cooling of the drawn fibre.

BRIEF DESCRIPTION OF THE DRAWINGS

The present invention will now be described in more detail hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DETAILED DESCRIPTION

In the preferred embodiments, the glass core preform to be obtained by the method consistent with the present disclosure is used for the manufacturing of a single-mode optical fibre suitable for optical transmission systems.

Preferably, the glass core preform is made of a silica-based material.

The glass core preform is obtained from a soot preform formed using a flame hydrolysis deposition process, preferably an outside vapor deposition OVD process. In the OVD process, a longitudinal mandrel, generally tapered to ease removal and made of alumina or other ceramic material, is secured to a hollow handle at one of its ends, which will be referred to as preform handle. The preform handle is typically of a generally tubular shape with one or more protuberances to ease suspension and/or engagement of the preform in the apparatus for further processing of the core preform. The preform handle and the opposite end of the mandrel are mounted on a lathe configured to rotate the mandrel and translate it with respect to one or more flame hydrolysis burners that supply a stream of silica-based particulate material (i.e. soot) for the formation of a porous soot preform. Flow-rates of reactants introduced in the burners, e.g. $GeCl_4$ and $SiCl_4$, may be varied during deposition of the soot layers, in a way per se known, to obtain a predetermined refractive index profile in the soot preform. In some embodiments, the soot core preform comprises a core region with positive relative refractive index with respect to the refractive index of silica, and an inner clad region surrounding the core region. Preferably, the core region is made of silica doped with a doping element that increases the refractive index, such as germanium. In some embodiments, the refractive index profile of the core region may exhibit a central dip surrounded by a region of relative positive refractive index. The inner clad region has a lower index of refraction than that of the central core region and is preferably made of non intentionally doped silica, which is referred in the present description to as pure silica. In other embodiments, the inner clad region made of non intentionally doped silica comprises one or more trenches (in which case a trench comprises a dopant which lowers the refractive index) and/or one or more rings (in which case a ring comprises a dopant which increases the refractive index).

As it is generally known, during deposition, soot fills outwardly a longitudinal portion of the preform handle making it integral with the soot core preform and for that reason it is often indicated as core integral handle.

After completion of the deposition process, the mandrel is removed from the soot preform leaving a central hole along the longitudinal axis of the soot preform. The soot core preform is subject to a dehydration and consolidation process in order to form a glass core preform.

Figure 1:
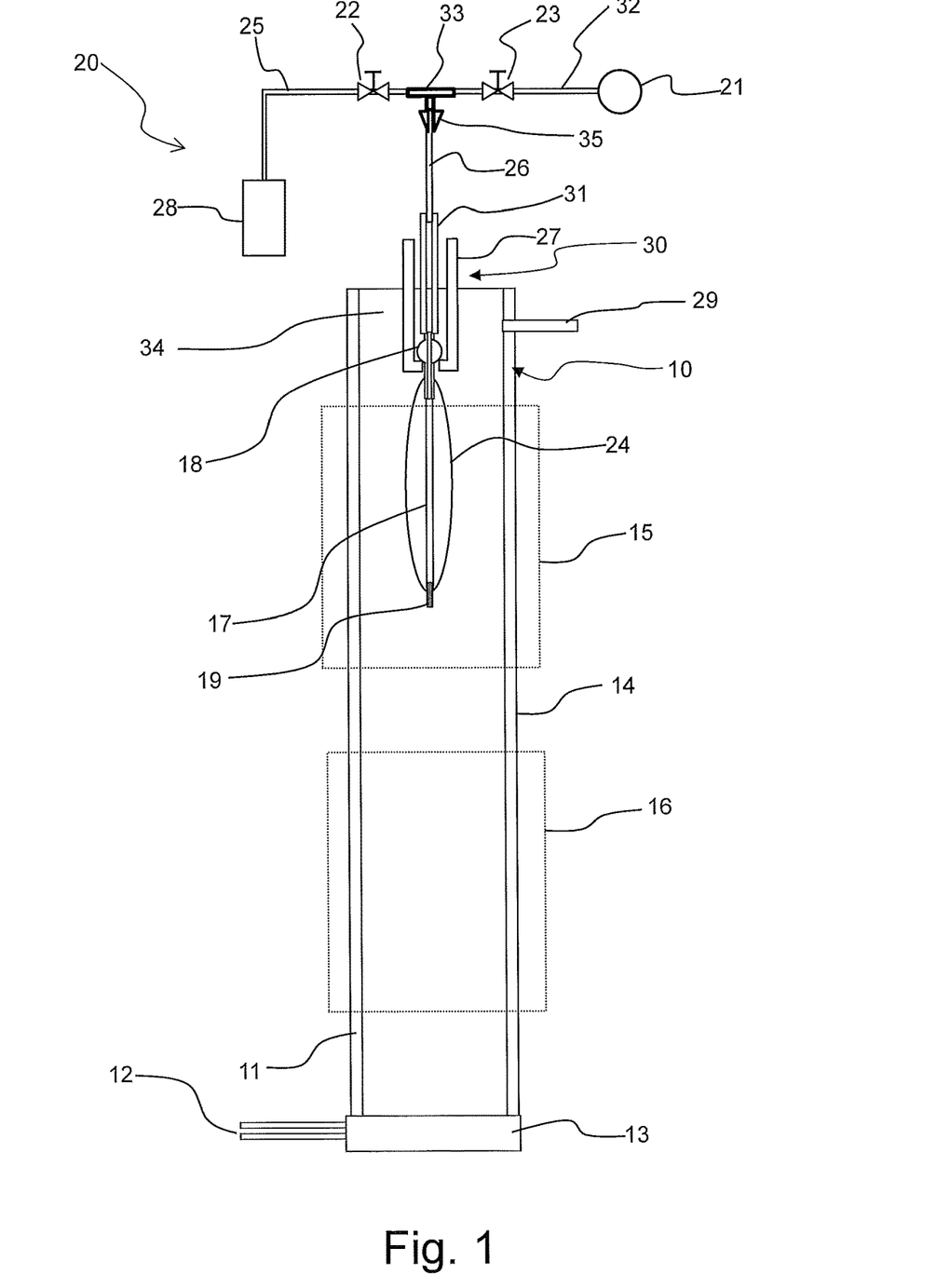
FIG. 1 is a schematic diagram of a lateral view of an apparatus for consolidation of a soot preform with some parts shown in cross-sectional view to better highlight some details of the apparatus, in accordance with an embodiment consistent with the present disclosure.

FIG. 1 is a lateral view of an apparatus for dehydration and consolidation of a soot preform with some parts shown in cross-sectional view to better highlight some details of the apparatus, in accordance with an embodiment consistent with the present disclosure. A porous soot core preform 24, preferably obtained by OVD, is processed in a dehydration and consolidation apparatus 20. The porous preform 24 has a longitudinal axis and a central hole 17 along the longitudinal axis, which extends axially through the preform. The porous soot preform has an outer surface and an inner surface longitudinally delimiting the central hole 17, which has an inner diameter. For example, the central hole has an inner diameter of from 8 mm to 10 mm.

The porous preform is provided at one of its ends with a hollow preform handle 18 attached to one end of the preform or being an integral part of the preform. Preform handle 18 has a longitudinal aperture in correspondence to the central longitudinal hole 17. This configuration allows feeding of gases and/or application of vacuum through the handle down to the central hole.

The apparatus 20 comprises a furnace body 10 having a basement 13. The furnace body 10, which is configured to house an elongated preform, extends along a furnace longitudinal direction and it is vertically oriented so that the furnace longitudinal axis is parallel to a downfeed direction for the translational movement of the preform along the furnace body. The furnace body is preferably a vertical muffle, more preferably of cylindrical shape, having a lateral wall 11 with an inner surface. The furnace is connected to a first gas delivery system (not shown) through one or more gas inlet ducts 12 for the supply of carrier gases, which are discharged from an outlet 29. In the embodiment of the figure, gases are fed from the bottom of the furnace. When gases are fed through ducts 12, the outer surface of the preform is exposed to an atmosphere containing those gases, which can penetrate across the porous structure of the soot.

The porous preform 24 is suspended by means of a conventional vertical translational device or downfeed system 30, of which only part is diagrammatically shown in the figure. The downfeed system 30 comprises a support handle 27, for example a hook-on support handle engaging the preform handle 18. In ways per se known, the downfeed system imparts to the support handle 27 a translational movement (up and down) along the furnace body and a rotation about a longitudinal axis parallel to the downfeed direction. Consequently, the preform can move down (and up) in the furnace body and can rotate about its longitudinal axis.

The top part of the preform handle 18 is connected to a hollow inner handle 31, inserted in the support handle 27. A gas flow passage is provided through the hollow inner handle 31 down into the central hole 17 of the preform through the preform handle. An inlet duct 26 is inserted into the axial aperture of the hollow inner handle 31, the inlet duct 26 being connected to a first supply duct 25 and to a second supply duct 32. Preferably, the inlet duct 26 is a flexible tube of suitable length so as to allow the movement of the preform up and down the furnace body. Since it is preferred that the preform rotates during consolidation (and preferably also during dehydration), the tube 26 needs to rotate to follow the rotation imparted to the support handle 27 by the downfeed system 30. First and second supply ducts 25, 32 are stationary. For example, an end of the inlet duct 26 opposite to the end connected to the hollow inner handle 31 is connected to the first and second supply ducts through a T-junction 33 and a rotary junction 35 connects the inlet tube to the T-junction. The first supply duct 25 is in communication with a second gas delivery system for feeding a gas down to the central hole. For example, the second gas delivery system is a gas cylinder 28. The gas cylinder contains $Cl_2$ gas. The second supply duct 32 is connected to a vacuum pump or to a vacuum source 21 for applying vacuum in the central hole 17. On the first and second supply ducts a respective first and second valve 22, 23 is arranged to control closure and opening of the ducts. In an embodiment, first and second valves 22, 23 are on/off valves.

Preferably, valves 22, 23 are electrovalves so that their operation can be controlled electronically by a control unit, which controls also, in ways per se known, feeding of gases through duct 26 and ducts 12 and operation of the vacuum pump 21 to set the vacuum pressure to be applied to the central hole. In some embodiments, electrovalves are controlled by the control unit in such a way that when valve 22 is closed, valve 23 is open and a vacuum is created inside the central hole 17, whereas when valve 23 is closed, valve 22 is open and chlorine gas flows down the central hole.

The supporting handle 27 enters the cavity 34 of the furnace body 10 from the top. Although not shown in the figure, the furnace body is provided with a top hat that acts as closure lid of the main furnace body and has a hole through which the supporting handle 27 passes. When the preform is completely inserted, as in the configuration shown in the figure, the top hat prevents gases and heat from leaking out from the top of the furnace body 10.

Preferably, a short rod or plug 19, preferably made of glass, more preferably of low-temperature melting glass, is fitted at the bottom of the central hole, opposite to the upper side of the hole connected to the inlet tube 27, for sealing the channel from below thereby preventing the gas exiting through its bottom.

For the process of dehydration and consolidation to start, the porous soot core preform is attached to the downfeed system 30 and it is positioned above and outside the furnace body. The porous preform is then moved down to a drying hot zone 15 of the furnace, extending along the furnace longitudinal direction for a first longitudinal section of the furnace body 10. The drying hot zone 15, or dehydration hot zone, indicated in the figure with a dotted line, is for dehydration of the porous layers of the soot core preform. Preferably, drying hot zone 15 is an isothermal zone. One or more drying gases, typically including or consisting of chlorine, are fed through ducts 12 together with an inert gas, preferably helium. The drying hot zone is set at a temperature Td that induces no sintering of the soot. In some embodiments, the dehydration phase is at a temperature Td of from 950° C. to 1100° C. Preferably, during dehydration, the soot preform remains stationary with respect to the vertical direction of the furnace body, in correspondence to the drying hot zone 15, and rotates in order to ensure axial symmetry of the process.

When gases are fed through ducts 12, the outer surface of the preform is exposed to an atmosphere containing He and $Cl_2$, which flow through the soot to dry the preform. In a different embodiment, $Cl_2$ is fed into the central hole 17, whereas He flows upwardly through the furnace body 10 from inlet ducts 12.

The preform 24 is then moved down, preferably at constant speed, towards a consolidation hot zone 16 (always indicated with a dotted line) positioned below the drying hot zone 15. The consolidation hot zone 16 extends along the furnace longitudinal direction for a second longitudinal section of the furnace body 10.

When entering the consolidation hot zone, the core preform 24 undergoes to a sintering or consolidation process. In the consolidation process, the preform is gradually lowered through the consolidation hot zone maintained at a temperature Tc higher than that of the drying hot zone. Preferably, the temperature Tc of the consolidation hot zone during consolidation is of from 1500° C. to 1600° C. The preform is down driven through the consolidation hot zone at a given rate in order to fully consolidate the preform from the bottom to the top. By passing through the consolidation hot zone, the porous preform shrinks radially (and axially) and it is vitrified so as to obtain a glass core preform.

In the embodiment shown in FIG. 1, the drying hot zone and the consolidation hot zone are separated one from another by a transition zone 14. Preferably, when the preform 24 is moved down towards the consolidation hot zone 16, at the end of the dehydration phase, the temperature of the consolidation hot zone is set at a temperature Ti higher than the temperature used for the dehydration process and lower than a temperature Tc set for consolidation when the bottom of the preform enters the second zone. Preferably, the difference between the intennediate temperature Ti and the consolidation temperature, (Tc-Ti), is of from 40° C. to 80° C. In some embodiments, Ti is of from 1450° C. to 1550° C.

Setting of the consolidation hot zone to a temperature lower than the temperature Tc is in some embodiments advantageous in order to hinder the commencement of sintering at least during a first stage of the descent of the preform towards the consolidation hot zone.

As the core preform is down driven through the consolidation hot zone at a consolidation temperature Tc, flowing of chlorine gas down into the central hole and reduction of pressure in the central hole are sequentially alternated. In some embodiments, this is achieved by alternately opening and closing valves 22 and 23, whereby when valve 22 is closed, valve 23 is open and a vacuum is created inside the central hole 17, whereas when valve 23 is closed, valve 22 is open and chlorine gas flows down the central hole. First valve 22 remains open while the second valve 23 remains closed, and then the second valve 23 remains open while the first valve 22 remains closed. The sequence of the opening and closing of first valve 22 while second valve 23 is closed or open, respectively, defines a cycle. The alternate opening and closing of the valves is repeated continuously during the descent of the preform through the consolidation zone 16 so as to define a plurality of cycles. Each cycle comprises a first time $t_G$ in which valve 22 is open (with valve 23 closed) and a second time $t_V$ in which valve 23 is open (with valve 22 closed). The first and second times $t_G$, $t_V$ are selected so as to allow a complete closure of the central hole 17 during the consolidation phase, i.e. during the descent of the preform through the consolidation hot zone 16.

Preferably, the first time $t_G$ is of from 5 to 40 seconds. In some embodiments, the first time $t_G$ is of from 10 seconds to 30 seconds. Preferably, the second time $t_V$ is of from 1.5 min to 30 min. Preferably, the ratio between the first time duration and the second time duration is of from 1/100 to 1/10, more preferably 1/70 to 1/25.

The number of cycles generally depends on the overall collapsing time, which is in some embodiments of from 100 min to 300 min. In some embodiments, the number of cycles is of from 5 to 150, preferably from 10 to 40.

Preferably, during consolidation, the outer surface of the core preform is exposed to an atmosphere containing an inert gas, preferably helium. With reference to FIG. 1, during the descent of the preform through the consolidation hot zone, helium is fed from inlets 12. In some embodiments, the flow rate of He is of from 20 to 100 l/min.

During consolidation, there is no intentionally added chlorine in the gas flown from inlets 12, so that the only source of chlorine is from the gas pulses down the preform central hole.

Preferably, the descent rate of the preform through the consolidation hot zone 16 is constant. In some preferred embodiments, the descent rate during consolidation is of from 3 mm/min to 5 mm/min.

It is to be understood that, although description of the present embodiments refers to $Cl_2$ gas, a different chlorine-containing gas can be used, such as $SiCl_4$, as source of chlorine.

In an embodiment, the dehydratation/consolidation apparatus 20 comprises a first heater (not shown in the figure), which is placed in the proximity of the outer surface of the furnace body to heat its inner surface at a given temperature or temperature range. In an embodiment, the apparatus 20 further comprises a second heater (not shown in the figure), which is placed in the proximity of the outer surface of the furnace body and positioned below the first heater.

For example, the first and the second heaters have a ring shape and are attached to the outer circumference of the cylindrical muffle tube constituting the body of the furnace. In this example, the first heater defines the drying hot zone and the second heater defines the consolidation hot zone.

In the presence of a transition zone 14, the first and the second heaters are longitudinally separated one from another by a longitudinal section along the furnace body, defining the length of the transition zone.

During consolidation, the core preform is rotated about its own axis. In this way, the outer surface of the core preform is uniformly exposed to the heat-radiating internal surface of the furnace body. Preferably, the rotational speed of the preforms is constant during the consolidation process and, if present, during the drying process.

Preferably, the glass core preform has a core-to-clad ratio a/b, which is preferably larger than 0.25, more preferably of from 0.28 to 0.33.

Subsequently to the consolidation of the core preform and closure of the central hole, the glass core preform is extracted from the furnace body and it is subjected to a stretching process to reduce its outer diameter and enhance straightness of the cylindrical rod. Stretching process can be carried out by means of a conventional stretching apparatus. The stretched core preform is severed in a plurality of core rods, each of the core rods constituting a central region of a final optical fibre preform.

Each core rod is used as substrate for an overcladding process, per se known, in order to form an optical fibre preform having a core region, (typically) an inner clad region, and an overclad region surrounding the core region or the inner clad region. Preferably, a soot overclad layer is formed by depositing soot material on the outer circumference of the core rod by a flame hydrolysis process. Preferably, the overcladding region is formed by an OVD process, in which the core rod is placed on a horizontal lathe and deposition of silica soot takes place outside the rotating core rod until the desired amount of material, which is related to the desired thickness of overclad region, is grown around the core rod.

Once the desired thickness of the soot overclad layer is achieved on the core rod, soot deposition for the formation of the soot overclad layer is terminated. Preferably, the overclad region is made of pure silica.

The resulting partially porous preform is dried and sintered in a furnace, which can be a dehydradation-consolidation furnace of the type described with reference to FIG. 1, in which gases are fed only from the bottom side of the furnace body. Consolidation produces a glass preform for an optical fibre.

Following the formation of a glass optical fibre preform, in the usual ways, the glass optical fibre preform is lowered at a relatively low speed into a drawing tower including a furnace having a hot zone where it is heated at a melting temperature (typically, at a temperature within the range 1900° C.-2100° C.) in the neck-down region, where glass softens and it is submitted to reduction in cross-sectional area to the desired cross-sectional area of the fibre. From the lower tip of the neck-down region, the optical fibre emerges where it is gripped by a mechanical device and wound in one or more reels.

In some embodiments, a first treating area is provided downstream from the drawing furnace through which the drawn fibre passes and a second treating area is provided downstream from the first treating area. In an embodiment, the first treating area is a first tube directly connected to the furnace and the second treating area comprises a heating furnace surrounding a second tube and an extension third tube, positioned just below the second tube. The first and second treating areas allow a controlled cooling of the fibre slower (or faster) than that occurring at room temperature when the fibre is exposed to ambient air right after exiting the drawing furnace.

In some embodiments, cooling of the optical fibre while it is drawn is through contact with a cooling fluid in the first treating area. The selection of the fluid flown in the first treating area and its flow rate affects the cooling rate of the drawn fibre.

For fast cooling, meaning cooling at a rate faster than cooling in ambient air, helium gas is flown in the first treating area, which is known to have a high heat transfer.

By using a gas mixture comprising helium, by decreasing the helium content in favour of gases having lower heat transfer than helium, such as argon or nitrogen, cooling rate decreases. In some embodiments, a mixture of argon and helium gases are flown in the first treating area resulting in a slow cooling, i.e. cooling at a slower rate than cooling in helium atmosphere, in the first treating area. In some preferred embodiments, helium, argon, nitrogen or mixtures of those or similar gases are flown in the second treating area, with the furnace temperature set at a temperature higher than or close to the temperature of the fibre entering the second treating area, resulting in a slow cooling, i.e. cooling at a slower rate than cooling in ambient air, in the second treating area.

Methods of cooling an optical fibre while it is being drawn are described in US 2001/0006262 and US 2001/0005993.

EXAMPLES

Comparative Example 1

A cylindrical alumina mandrel was secured to a hollow tubular handle at one of its ends. The hollow tubular handle and the opposite end of the mandrel were mounted on a lathe for the formation of a $GeO_2$-doped silica porous soot preform by outside vapor deposition (OVD). Flow-rates of reactants $GeCl_4$ and $SiCl_4$ were varied during deposition, in a way per se known, to obtain a predetermined refractive index profile in the soot preform. The resulting core soot preform had a germanium-doped core region and an undoped silica inner clad region surrounding and in contact with the core region.

The mandrel was then extracted from the core soot preform, leaving a central hole therein, extending longitudinally across the core soot preform. After soot deposition, the hollow tubular handle was integral to the soot preform and allowed handling and support of the preform in the subsequent process stages for fabrication of core rods.

The soot core preform was suspended to a supporting rod of a downfeed structure of a dehydration/consolidation apparatus of the type shown in FIG. 1, for holding the preform through the integral handle. A short glass rod 19 was fitted at the bottom of the central hole, opposite to the upper side connected to the handle, for sealing the channel from below. The preform was then inserted in the dehydration/consolidation furnace and maintained in the drying hot zone of the furnace for dehydration at about 1100° C. for 60 minutes while it was uniformly rotating at a rotational speed of 1 turn/min. Helium and $Cl_2$ gases were fed from gas ducts 12 with flow of 5 l/min of $Cl_2$ and 80 l/min of He, so that dehydration took place in an atmosphere containing He and $Cl_2$.

The dehydrated preform was lowered at a rate of 5.2 mm/min towards the consolidation hot zone of the furnace set at 1540° C. (Ti) for about 120 minutes.

Then, the temperature of the consolidation hot zone temperature was raised to about 1600° C., while the preform continued to be down-driven at the same rate for an additional time of about 40 min. At the end of this additional time, the bottom part of the preform was very close to (i.e. about to enter) the consolidation hot zone. At this point the $Cl_2$ flow entering the furnace through ducts 12 was stopped and the helium flow rate was lowered to 20 l/min. The descent rate was lowered to 4 mm/min and the central hole was connected to a vacuum pump to create a vacuum of less than 100 mbar. These conditions were maintained for about 160 min, resulting in the consolidation of the full preform and the contemporary closure of the central hole.

The fused glass material forming the core preform then cooled and was subjected to a stretching process to reduce its outer diameter and enhance straightness of the cylindrical rod. The stretched core preform was severed in a plurality of cylindrical elongated core-rods of predetermined diameter. Each core rod was used as a substrate for a further process of chemical deposition by OVD to form a silica soot layer for the overclad region. The partially porous preform was dehydrated by maintaining the preform in a dehydration hot zone of the dehydration-consolidating furnace and it was then sintered by down driving the partially porous preform through the consolidation hot zone, while rotating the preform, thus obtaining a vitrified optical fibre preform, according to a conventional process.

The optical fibre preforms were drawn on respective drawing towers, wherein each preform was supplied, along a vertical direction, to a furnace, so as to obtain melting of a lower portion thereof.

Optical fibres from preforms produced according to the present example were either fast cooled or slow cooled down to room temperature when exiting the drawing furnace, by passing the fibre through a first treating area and a second treating area, the second treating area being positioned downstream the first treating area. In the first treating area, a fluid was flown to contact the outer surface of the fibre, whereas the second treating area comprised a heating furnace, as above described. When fast cooled, fibres were cooled to a temperature of about 1100° C. after 0.05 seconds from the fiber formation in the hot zone at about 2000° C., i.e. at the exit of the first treating area, by flowing helium in the first treating area.

In case of slow cooling, a mixture of helium and argon was flown in the first treating area to decrease the cooling rate of the fibre exiting the drawing furnace and fibres were cooled from about 2000° C. to a temperature between 1300° C. and 1400° C. after 0.05 s, i.e. at the exit of the first treating area, and to 1100° C. after at least 0.20 s, when the fibre exited the second treating area. The heating furnace of the second treating area was set at 1100° C.

Spectral attenuation measurements were performed on several bobbins of optical fibres by using a commercial PK 2200 measurement bench.

Optical fibres obtained by drawing with fast cooling exhibited average optical attenuation values of 0.335 dB/km at 1310 nm, of 0.195 dB/km at 1550 nm, and lower than 0.32 dB/km at 1383 nm.

When drawn with slow cooling, fibres exhibited optical attenuation of about 0.321 dB/km at 1310 nm, of about 0.183 dB/km at 1550 nm, and 0.30 dB/km at 1383 nm, values on average smaller than those reported above and obtained with fast cooling of the drawn optical fibre.

Typical maximum and minimum values and median values of optical attenuation for Example 1 are reported in Table 1.

TABLE 1

|  | @1310 nm (dB/km) | | | @1550 nm (dB/km) | | |
| --- | --- | --- | --- | --- | --- | --- |
|  | min | median | max | min | median | max |
| Fast cooling | 0.330 | 0.335 | 0.350 | 0.190 | 0.195 | 0.210 |
| Slow cooling | 0.315 | 0.321 | 0.330 | 0.180 | 0.183 | 0.190 |

Example 2

A soot core preform was obtained under the same experimental conditions used in Example 1. The mandrel was removed while the hollow tubular handle remained, integral with the soot preform at one of its ends. The soot preform had a length of 800-1000 mm.

The soot core preform was inserted in a drying hot zone at about 1100° C. of the same dehydration/consolidation apparatus of Example 1 and maintained in that drying, hot zone for 60 minutes in a 80 l/min He+1.5 l/min $Cl_2$ flow, with a rotational speed of 1 turn/min, for elimination of hydroxide ions and water molecules (dehydration process).

The dehydrated preform was lowered at a rate of 5.2 mm/min towards the consolidation hot zone of the furnace set at 1540° C. for about 120 minutes, as in Example 1.

Then, the temperature of the consolidation hot zone temperature was raised to about 1600° C., while the preform continued to be down-driven at the same rate for an additional time of about 40 min. At the end of this additional time, the bottom part of the preform was very close to (i.e. about to enter) the consolidation hot zone. At that point, the $Cl_2$ flow entering the furnace through ducts 12 was stopped and the helium flow rate was lowered to 20 l/min. The descent rate was lowered to 4 mm/min. During the consolidation process, in which the preform was down-driven through the consolidation hot zone, the outer surface of the preform was therefore exposed to an atmosphere containing helium and substantially devoid of chlorine, whereas chlorine was introduced only into the central hole of the preform, as explained more in detail in the following. The preform was down-driven through the consolidation hot zone at Tc=1600° C. to be consolidated and the central hole collapsed at the same time. Closure of the central hole was realized by sequentially and alternatively closing and opening valves 22 and 23. When valve 22 was open, $Cl_2$ gas was injected into the hole. Valve 23 was connected to a vacuum pump 21, which, when valve 23 was open, produced a pressure of less than 100 mbar into the hole. For each cycle, valve 22 was opened for 15 sec and closed for 8 min, and vice-versa valve 23 was closed for $t_G$=15 s and opened for $t_V$=8 min. The number of cycles was 28.

A glass core preform was produced, which was subjected to a stretching process, an overcladding process and a drawing process analogous to those of Example 1.

Example 3

Example 3 differs from Example 2 only in that, during consolidation, for each cycle, $t_V$ was of 16 min (with $t_G$=15 s) and the number of cycles was 14. A glass core preform was produced, which was subjected to a stretching process, an overcladding process and a drawing process similar to those of Example 1.

Fibers drawn from preforms produced according to the above processes of Examples 2 and 3 and drawn in way to be fast cooled to a temperature of about 1100° C. after 0.05 s from their formation in the hot zone at about 2000° C. (analogous conditions to those of fast cooling for Example 1), showed an average improvement of 0.005 dB/km at wavelengths 1310 nm and 1550 nm with respect to Example 1.

When drawn with slow cooling, in particular by cooling to a temperature between 1300° C. and 1400° C. after 0.05 s and to 1100° C. after at least 0.20 s, fibres produced according to Examples 2 and 3 showed an improvement of median values of 0.001 dB/km at wavelengths 1310 nm and 1550 nm with respect to the fibres of Example 1 processed by slow cooling under analogous conditions.

Typical maximum and minimum values and median values of optical attenuation for Examples 2 and 3 are reported in Table 2.

TABLE 2

|  | @1310 nm (dB/km) | | | @1550 nm (dB/km) | | |
| --- | --- | --- | --- | --- | --- | --- |
|  | min | median | max | min | median | max |
| Fast cooling | 0.327 | 0.330 | 0.333 | 0.188 | 0.190 | 0.193 |
| Slow cooling | 0.315 | 0.320 | 0.323 | 0.180 | 0.182 | 0.185 |

Noteworthy, fibres of Examples 2 and 3, processed by both fast and slow cooling, exhibited attenuation values which are spread out, both at 1310 nm and at 1550 nm, over narrower ranges than ranges for fibres of Example 1, thereby showing an improvement of the output stability of the fibre production.

Figure 2:
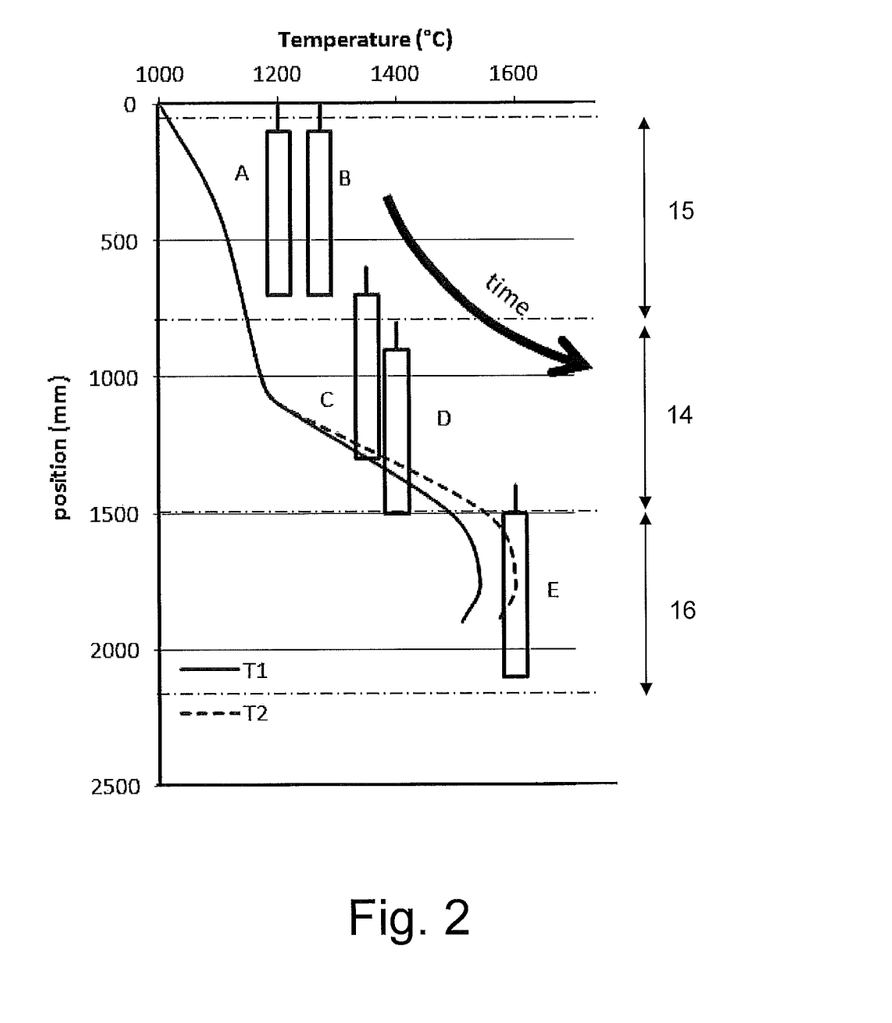
FIG. 2 is a plot model representing schematically the temperature gradient and the longitudinal position of the preform in a furnace during a process of dehydration and consolidation of a core soot preform.

FIG. 2 is a plot model schematically representing the temperature gradient and the longitudinal position of the preform in a furnace body during the process of dehydration and consolidation of a core soot preform, consistent with Examples 1 to 3 of the present disclosure. In the y-axis of the plot, the longitudinal position along the furnace body, where the value 0 represents the top of the furnace. Drying hot zone 15, transition zone 14 and consolidation hot zone 16 are indicated in the figure by horizontal dot-dash lines. Letters "A" to "E" indicate the temporal evolution of the dehydration and consolidation process. Length of the furnace muffle is of 2.5 m.

The soot core preform is inserted at time A in the drying hot zone 15 for thermal stabilisation and dehydration until time B. The temperature of the drying hot zone is set at 1100° C. and dehydration takes place in an atmosphere containing helium and chlorine. Dehydration is under isothermal conditions and the preform rotates while being stationary in the drying hot zone 15. While dehydration takes place, the consolidation hot zone is set at a temperature Ti larger than the dehydration temperature, but lower than the consolidation temperature Tc. At the end of the dehydration phase, the soot preform is gradually lowered at a constant rate towards consolidation hot zone 16. At time C, the preform is in the transition zone 14 of the furnace body. For Ti=1540° C. and times between B and C, the estimated temperature of the preform ranges approximately from 1100° C. to 1350° C. At time C, the temperature of the consolidation hot zone is raised to a value Tc that will be used during consolidation as the preform continues its descent at the same rate. In the example, temperature is raised to Tc=1600° C. At time D, the bottom of the preform enters the consolidation hot zone at 1600° C. and consolidation starts from the bottom to the top of the preform. Consolidation, simultaneously to the collapse of the preform central hole, is carried out until time E at which the whole preform has crossed the consolidation hot zone 16 and a core preform of solid glass is obtained.

Curves in the graph of FIG. 2, indicated with T1 (solid line) and T2 (dashed line), represent the thermal profiles in the furnace, namely the local temperature at each longitudinal position of the furnace, independently from the presence of the preform in that position. Temperature profiles were obtained by measuring the temperature at different heights in the muffle. T1 is the thermal profile when the consolidation hot zone is maintained at the intermediate temperature of 1540° C., while T2 is the thermal profile when the temperature of the consolidation hot zone temperature is raised to 1600° C. at time C.

What is claimed is:

1. A method of manufacturing a glass core preform for an optical fibre comprising:
   providing a porous soot core preform having an outer surface and a central hole extending axially therethrough;
   dehydrating the porous soot core preform at a first temperature by exposing the outer surface of the preform to an atmosphere containing chlorine, and simultaneously consolidating the soot core preform and closing the central hole at a second temperature higher than the first temperature to form a glass core preform,
   wherein simultaneously consolidating and closing comprises sequentially alternating flowing chlorine containing gas into the central hole and reducing the internal pressure of the central hole, and
   wherein a single sequence of alternated flowing of chlorine containing gas and reduction of pressure defines a cycle and the alternated flowing of chlorine containing gas and reducing the internal pressure in the central hole is for a plurality of cycles during simultaneous consolidation and closing of the central hole.

2. The method of claim 1, wherein reducing the internal pressure is to a pressure value of less than 100 mbar.

3. The method of claim 1, wherein the alternated flowing of chlorine containing gas and reducing the internal pressure in the central hole continues during the consolidation process to allow a complete closure of the central hole of the core preform.

4. The method of claim 1, wherein simultaneously consolidating and closing the central hole comprises exposing the outer surface of the core preform to an atmosphere containing an inert gas and substantially devoid of chlorine.

5. The method of claim 1, wherein the chlorine containing gas is $Cl_2$.

6. The method of claim 1, wherein flowing chlorine containing gas into the central hole occurs during a first time period and reduction of internal pressure of the central hole occurs during a second time period.

7. The method of claim 6, wherein the first time period is from 5 sec to 40 sec.

8. The method of claim 6, wherein the second time period is from 1.5 min to 30 min.

9. The method of anyone of claim 6, wherein the ratio between the first time and the second time period and the second time period is from 1/100 to 1/10.

10. The method of claim 1, wherein flowing chlorine containing gas into the preform central hole is at a flow rate and for a first time sufficient as to fill the preform central hole with the chlorine containing gas to a pressure equal to or larger than 1 bar and less than 2 bar.

11. The method of claim 1, wherein:
    dehydrating comprises exposing the soot core preform to a drying hot zone of a furnace body, the drying hot zone being at the first temperature, and
    consolidating comprising exposing the preform to a consolidation hot zone of a furnace body, the consolidation hot zone being at the second temperature.

12. The method of claim 11, wherein the furnace body is elongated with the consolidation hot zone being positioned below the drying hot zone and having a transition zone positioned longitudinally between the drying hot zone and the consolidation hot zone, the method further comprising, between dehydrating and consolidating:
    setting the consolidation hot zone at a third temperature higher than the first temperature and lower than the second temperature;
    moving the core preform from the drying hot zone towards the consolidation hot zone through a first section of the transition zone; and
    setting the consolidation hot zone at the second temperature while keeping moving the core preform through a second section of the transition zone longitudinally adjacent to the first section of the transition zone until the preform enters the consolidation hot zone.

13. A method of manufacturing an optical fibre comprising:
    manufacturing a glass core preform according to claim 1, the glass core preform having an outer diameter;
    stretching the glass core preform to reduce the outer diameter thereby forming at least one glass core rod;
    overcladding the glass core rod to form an optical fibre preform formed by the glass core rod surrounded by a glass overclad layer, and
    drawing the optical fibre preform to fabricate an optical fibre.

* * * * *

UNITED STATES PATENT AND TRADEMARK OFFICE
CERTIFICATE OF CORRECTION

| | | |
|---|---|---|
| PATENT NO. | : 10,544,057 B2 | Page 1 of 1 |
| APPLICATION NO. | : 15/735684 | |
| DATED | : January 28, 2020 | |
| INVENTOR(S) | : Franco Cocchini et al. | |

It is certified that error appears in the above-identified patent and that said Letters Patent is hereby corrected as shown below:

In the Claims

Column 16, Line 21, Claim 9, please delete the following words: "anyone of"

Signed and Sealed this
Twenty-fourth Day of March, 2020

Andrei Iancu
*Director of the United States Patent and Trademark Office*